US008892669B2

(12) United States Patent
Ebara

(10) Patent No.: US 8,892,669 B2
(45) Date of Patent: Nov. 18, 2014

(54) COMMUNICATION TERMINAL HAVING EMAIL TRANSMISSION FUNCTIONALITY, METHOD FOR TRANSMITTING EMAIL, AND COMPUTER-READABLE RECORDING MEDIUM

(75) Inventor: Kenichi Ebara, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 289 days.

(21) Appl. No.: 13/500,126

(22) PCT Filed: Sep. 2, 2010

(86) PCT No.: PCT/JP2010/065060

§ 371 (c)(1), (2), (4) Date: Apr. 4, 2012

(87) PCT Pub. No.: WO2011/043145

PCT Pub. Date: Apr. 14, 2011

(65) Prior Publication Data

US 2012/0233280 A1 Sep. 13, 2012

(30) Foreign Application Priority Data

Oct. 5, 2009 (JP) ................................ 2009-231423

(51) Int. Cl.

*G06F 15/16* (2006.01)
*H04M 1/725* (2006.01)
*H04L 12/58* (2006.01)
*H04M 1/23* (2006.01)
*H04M 1/02* (2006.01)

(52) U.S. Cl.

CPC ........ *H04M 1/72552* (2013.01); *H04M 1/7258* (2013.01); *H04L 51/22* (2013.01); *H04M 1/236* (2013.01); *H04M 1/0245* (2013.01)
USPC ............................ 709/206; 709/207; 455/566

(58) Field of Classification Search

CPC ....... H04L 51/00; H04L 51/22; H04M 1/2472
USPC ........................... 709/206, 207; 455/544, 566
See application file for complete search history.

(56) References Cited

U.S. PATENT DOCUMENTS 7,336,979 B2 * 2/2008 Soejima ..................... 455/575.1
2002/0107051 A1 * 8/2002 An ................................ 455/564

(Continued)

FOREIGN PATENT DOCUMENTS

CN 1379610 A 11/2002
JP 2003-060741 A 2/2003

(Continued)

OTHER PUBLICATIONS

Office Action, dated May 20, 2014, issued by the Japanese Patent Office, in counterpart Application No. 2011-535319.

(Continued)

*Primary Examiner* — Ario Etienne
*Assistant Examiner* — Uzma Alam
(74) *Attorney, Agent, or Firm* — Sughrue Mion, PLLC

(57) ABSTRACT

Disclosed is a mobile phone provided with: a main body that can be put in a storage state or a usage state by changing the relative positions or relative orientations of a first unit and a second unit; a wireless communication unit (23) that transmits and receives email; a state detection unit (29) that detects whether the main body is in the storage state; a side key (24) that the user can press; a memory unit (28) that stores email information including email addresses and message bodies; and a control unit (20). The control unit measures how long the side key (24) is depressed, and if the state detection unit (29) has detected the storage state, then in accordance with the length of time for which the side key (24) was depressed, the control unit uses the wireless communication unit (23) to transmit, as an email, email information that is assigned to said length of time and stored in the memory unit (28).

6 Claims, 10 Drawing Sheets

(56) References Cited

U.S. PATENT DOCUMENTS

| | | | | |
|---|---|---|---|---|
| 2002/0128047 | A1* | 9/2002 | Gates | 455/566 |
| 2002/0146989 | A1 | 10/2002 | Moriki | |
| 2005/0129241 | A1 | 6/2005 | Hardy et al. | |
| 2005/0164745 | A1* | 7/2005 | Oe et al. | 455/566 |
| 2006/0221059 | A1* | 10/2006 | Choi et al. | 345/169 |
| 2008/0094258 | A1* | 4/2008 | Lee | 341/22 |
| 2009/0179869 | A1* | 7/2009 | Slotznick | 345/173 |

FOREIGN PATENT DOCUMENTS

| | | | |
|---|---|---|---|
| JP | 2004312525 | A * | 11/2004 |
| JP | 2006-5863 | A | 1/2006 |
| JP | 2007-304784 | A | 11/2007 |
| JP | 2008-228353 | A | 9/2008 |
| WO | 2009022657 | A1 | 2/2009 |

OTHER PUBLICATIONS

Office Action dated Feb. 11, 2014, issued by the State Intellectual Property Office of the P.R.C. in corresponding Chinese Application No. 201080045063.9.

* cited by examiner

FIG. 3
(a)
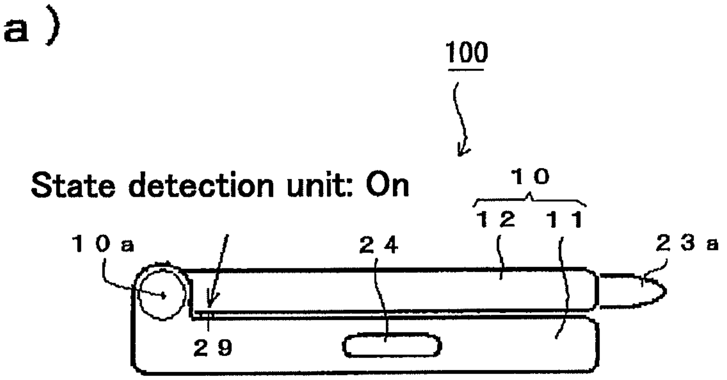
Storage state (folded stage)
(b)
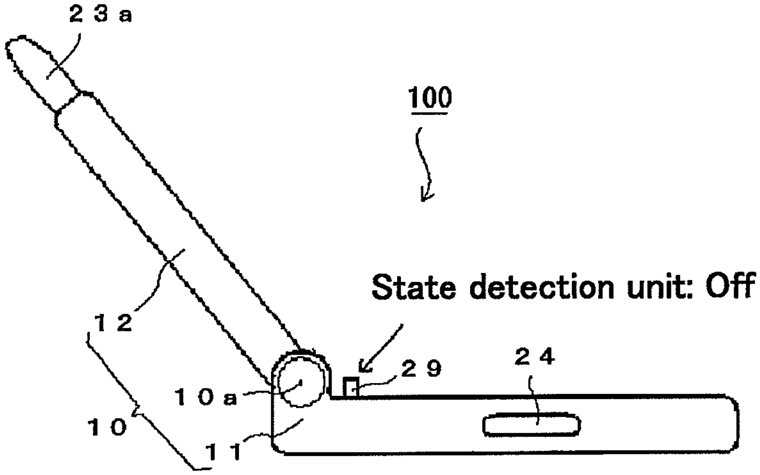
Usage state (open stage)

FIG. 7

| Register Number | Email information | | |
| --- | --- | --- | --- |
| | Email address | Destination | Message text |
| 1 | +++@***.&&.$$ | Wife | I'm heading home now. |
| 2 | +++@***.&&.$$ | Wife | Urgent business, so don't need dinner. |
| 3 | %%%@***.&&.$$ | Supervisor | Feeling sick today so won't be coming to work. |
| 4 | ###@***.&&.$$ | Friend | Can't meet for drinks tonight. |

FIG. 9

| Side key pressing time ts (sec) | Display contents of display unit | Display contents of rear display |
|---|---|---|
| 0 < ts < 1<br><br>(corresponding to register number 1) | Destination: wife<br><br>Email address: +++@***.&&.$$<br><br>Message text: I'm heading home now. | Wife: I'm heading home now |
| 1 ≤ ts < 2<br><br>(corresponding to register number 2) | Destination: wife<br><br>Email address: +++@***.&&.$$<br><br>Message text: Urgent business, so don't need dinner. | Wife: Urgent business so don't need dinner |
| 2 ≤ ts < 3<br><br>(corresponding to register number 3) | Destination: Supervisor<br><br>Email address: %%%@***.&&.$$<br><br>Message text: Feeling sick today so won't be coming to work. | Supervisor: Feeling sick today so won't be coming to work |
| 3 ≤ ts<br><br>(corresponding to register number ) | Destination: Friend<br><br>Email address: ###@***.&&.$$<br><br>Message text: Can't meet for drinks tonight. | Friend: Can't meet for drinks tonight |

FIG. 10
| Side key pressing time ts (sec) | Vibration pattern |
|---|---|
| 0 < ts < 1 | 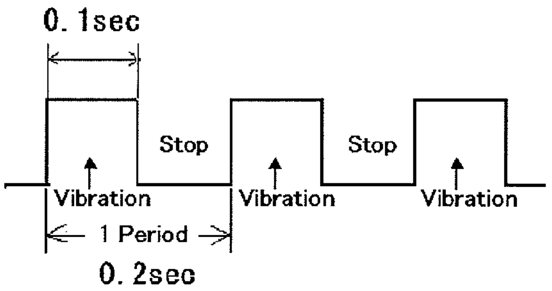 |
| 1 ≤ ts < 2 | 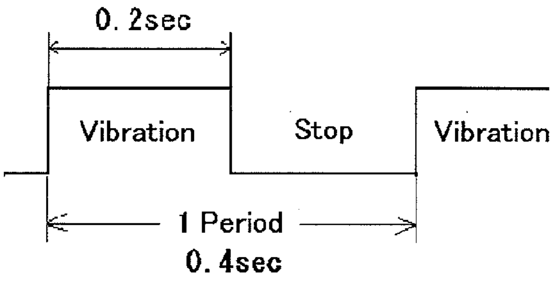 |
| 1 ≤ ts < 2 | 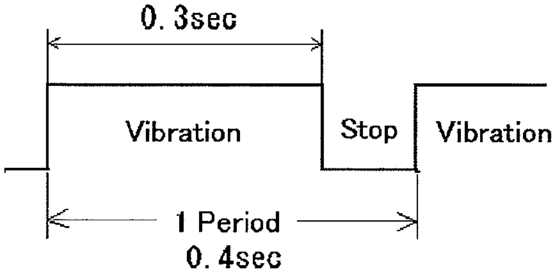 |
| 3 ≤ ts | 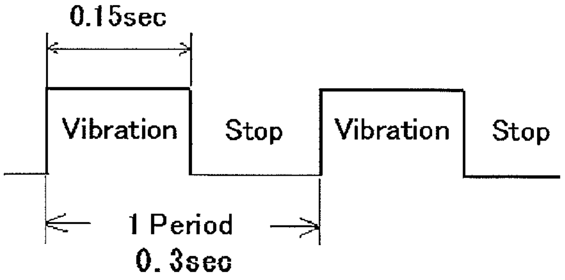 |

COMMUNICATION TERMINAL HAVING EMAIL TRANSMISSION FUNCTIONALITY, METHOD FOR TRANSMITTING EMAIL, AND COMPUTER-READABLE RECORDING MEDIUM

CROSS REFERENCE TO RELATED APPLICATIONS

This application is a National Stage of International Application No. PCT/JP2010/065060 filed Sep. 2, 2010, claiming priority based on Japanese Patent Application No. 2009-231423, filed Oct. 5, 2009, the contents of all of which are incorporated herein by reference in their entirety.

TECHNICAL FIELD

The present invention relates to a communication terminal having email transmission functionality, a method for transmitting email and a computer-readable recording medium.

BACKGROUND ART

Mobile phones, PCs (Personal Computers), PDAs (Personal Digital Assistants) and/or the like have become popular as communication terminals.

Such communication terminals are equipped with functions for transmitting and receiving email. Furthermore, when transmitting email using such communication terminals, complex keystrokes and button operation are necessary in order to launch the email function, read email addresses from memory, and input message text into the email input screen.

In addition, with this kind of communication terminal, even when transmitting predetermined message text to certain recipients such as family or friends, complex keystrokes and button operation are necessary, which undercuts convenience.

In contrast, a mobile phone (communication terminal) is known with which email can be transmitted to specific recipients such as family or friends through relatively simple keystrokes (for example, see Cited Literature 1).

With such a mobile phone, email addresses are stored in memory assigned to specific keys, and by pressing the specific key continuously for at least a prescribed time, that email address is called up to the email input screen as the recipient, enabling message text to be input and for the email to be transmitted after inputting.

PRIOR ART LITERATURE

Patent Literature

Patent Literature 1: Unexamined Japanese Patent Application Kokai Publication No. 2003-60741

DISCLOSURE OF INVENTION

Problems Overcome by the Invention

However, with this mobile phone (the mobile phone in Patent Literature 1), it is necessary to change and operate specific keys for each email recipient, and moreover, it is necessary to individually input message text through keystrokes or button operation. Consequently, even when transmitting predetermined message text as an email to specific recipients such as family or friends, complex keystrokes or button operation is necessary, causing user convenience to be lost. Hence, a communication terminal has been sought that can more conveniently transmit predetermined message text to specific recipients.

In consideration of the foregoing, it is an object of the present invention to profit a communication terminal having email communication functionality, a method for transmitting email and a computer-readable recording medium with which determined message text can be transmitted to specific recipients by a simply method.

Problem Resolution Means

The communication terminal according to a first aspect of the present invention comprises a communication unit for transmitting and receiving emails; an operation key operated by a user; a memory unit for storing email information including email addresses and message text; and a control unit for measuring the operation amount of the operation key and transmitting the email information assigned to this operation amount as email using the communication unit, in accordance with the operation amount of the operation key.

In addition, the email transmission method according to a second aspect of the present invention is an email transmission method executed in a communication terminal comprising a body settable in a storage state and a usage state;

wherein whether or not the body is in a storage state is detected; the operation amount of an operation key operated by a user is measured; and when it is detected that the body is in the storage state, email information including an email address and message text and assigned based on operation amount is transmitted as email in accordance with the operation amount of the operation key.

The computer-readable recording medium according to a third aspect of the present invention records a program that causes a computer built into a communication terminal comprising a body settable in a storage state and a usage state by changing the relative position or relative orientation of a first unit and a second unit; a communication unit for transmitting and receiving email; a state detection unit for detecting whether or not the body is in the storage state; and an operation key operated by a user; to function as a memory means for storing email information including an email address and message text, and a control means for transmitting the email information assigned to an operation amount as email using the communication unit, in accordance with the operation amount of the operation key, when the operation amount of the operation key is measured and the state detection unit detects that the body is in the storage state.

Efficacy of the Invention

With the present invention, it is possible to easily transmit predetermined message text to specific recipients.

BRIEF DESCRIPTION OF DRAWINGS

FIG. 3 is a side view showing the state in which the mobile phone according to the preferred embodiment is changed between a storage state and a usage state, with FIG. 3A showing the storage state of the mobile phone and FIG. 3B showing the usage state of the mobile phone;

FIG. 7 is a drawing showing the data structure of email information transmitted as an email;

FIG. 9 is a drawing showing email information displayed for different side key pressing times in the display unit and rear display unit of a mobile phone according to the preferred embodiment; and FIG. 10 is a drawing showing the vibration pattern with which the oscillation unit of the mobile phone according to the preferred embodiment vibrates for different side key pressing times.

BEST MODE FOR CARRYING OUT THE INVENTION

Below, the preferred embodiment of the present invention is described with reference to the drawings.

Figure 1:
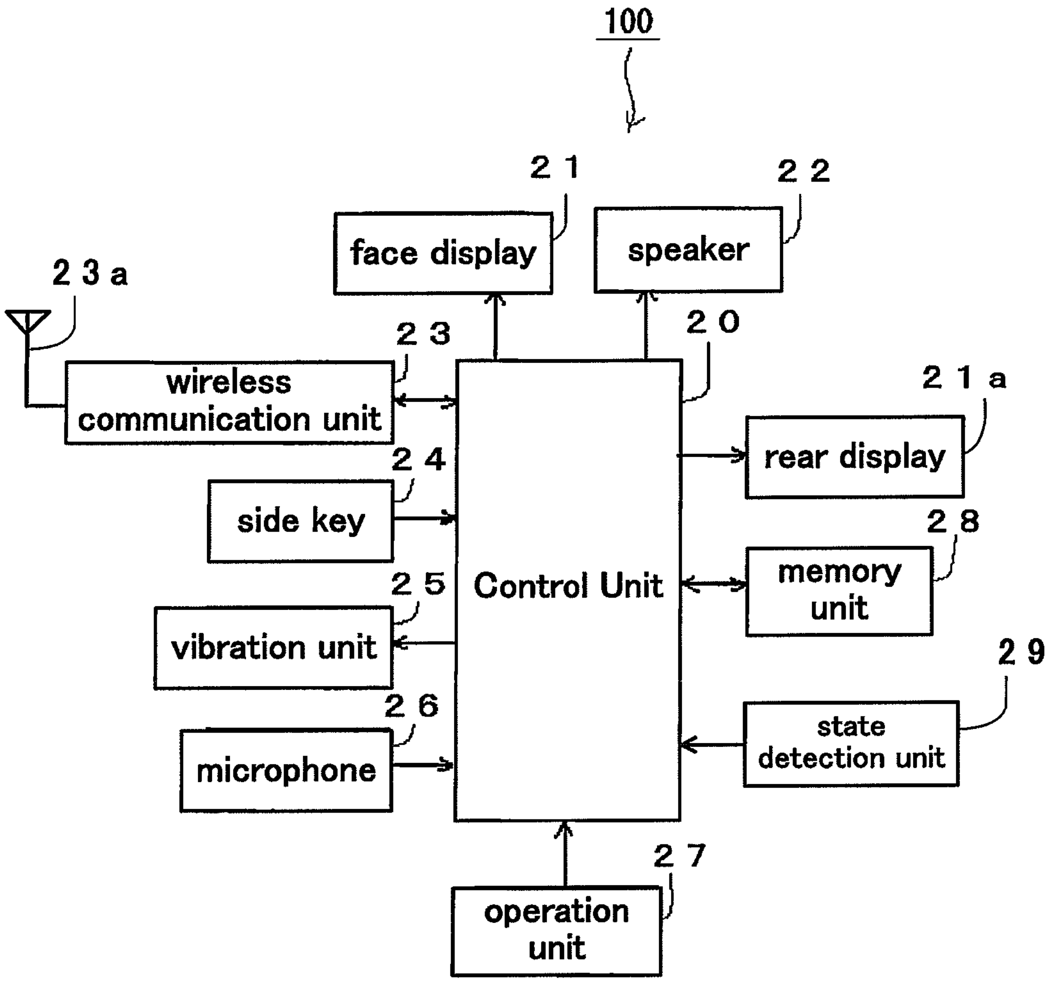
FIG. 1 is a block diagram of a mobile phone in which the communication terminal according to the preferred embodiment is realized.

FIG. 1 is a block diagram showing the summary composition of a mobile phone in which the communication terminal according to this preferred embodiment is realized.

A mobile phone 100 according to this preferred embodiment is provided with communication functions such as voice calls, transmitting and receiving emails, Internet access and receiving and playing TV broadcasts. As shown in FIG. 1, the mobile phone 100 comprises a control unit 20, a face display 21, a speaker 22, a wireless communication unit 23 having an antenna 23*a*, a side key 24, a vibration unit 25, a microphone 26, an operation unit 27, a rear display 21*a*, a memory unit 28 and a state detection unit 29.

The face display 21 functions as a main display unit, is composed of a liquid crystal display device, an organic EL (Electroluminescence) display device and/or the like, and displays various image information and text information such as emails. The rear display 21*a* functions as a sub-display unit, is composed of a liquid crystal display device and/or the like and displays various image information and text information simplified compared to the face display 21. The wireless communication unit 23 modulates radio waves received from the antenna 23*a* and converts such into electrical signals containing prescribed information, and modulates electrical signals containing prescribed information and transmits such from the antenna 23*a*. The side key 24 is composed of a push-button switch and is used to transmit prescribed email information as email through a pressing operation by the user. The state detection unit 29 is composed of a micro switch and detects the state of the mobile phone 100. The state of the mobile phone 100 indicates a state (hereafter referred to as a "storage state") in which the mobile phone is storable in a pocket and/or the like, being folded with a first unit 11 overlapping a second unit 12, or a state in which the mobile phone 100 is useable (hereafter referred to as a "usage state") for making telephone calls and/or transmitting email and/or the like, with the second unit 12 opened with respect to the first unit 11. The vibration unit 25 is composed of a vibration motor, with a weight attached so that the center of gravity is eccentric to the rotating shaft of the motor, such that when the motor rotates the motor vibrates due to the imbalance of the weight. This vibration unit 25 can vibrate in various vibration patterns in accordance with the signal pattern of electric signals input to the motor.

The control unit 20 is composed of a microcomputer containing a CPU (Central Processing Unit) and memory, and acts through programs stored in the memory unit 28.

The control unit 20 turns audio the user inputs from the microphone 26 into electrical signals by an audio processing unit (unrepresented), and transmits radio waves containing the audio information to a wireless network via the wireless communication unit 23 and the antenna 23*a*. In addition, the control unit 20 outputs as audio from the speaker 22 electrical signals containing audio information received from a wireless network via the antenna 23*a* and wireless communication unit 23.

In addition, the control unit 20 receives inputs of various types of information such as telephone numbers, email addresses, message text and/or the like, and various types of operations such as a scroll operation, a determination operation and/or the like, from the operation unit 27. In addition, the control unit realizes various types of functions such as connecting to the Internet, receiving and playing TV broadcasts and/or the like selected by the operation unit 27. Furthermore, the control unit 20 controls the wireless communication unit 23 and accomplishes email transmitting and receiving processes to and from wireless base stations.

In addition, the control unit 20 controls the face display 21 and the rear display 21*a*, and causes various types of image information and text information such as email addresses, message text and/or the like to be displayed based on various types of data stored in the memory unit 28 and input operations from the operation unit 27.

Furthermore, the control unit 20 controls the vibration unit 25, inputs to the motor electrical signals having various signal patterns, and causes the vibration unit 25 to vibrate with vibration patterns corresponding thereto. In addition, the control unit 20 recognizes "on" when the side key 24 and the state detection unit 29 are pressed, and recognizes "off" when pressing of the side key 24 and the state detection unit 29 is released.

The memory unit 28 is composed of RAM (Random Access Memory), ROM (Read Only Memory), a hard disk device, flash memory and/or the like, stores programs that cause the control unit 20 to operate and various data used in those programs, and also functions as a work area for the control unit 20.

Figure 2:
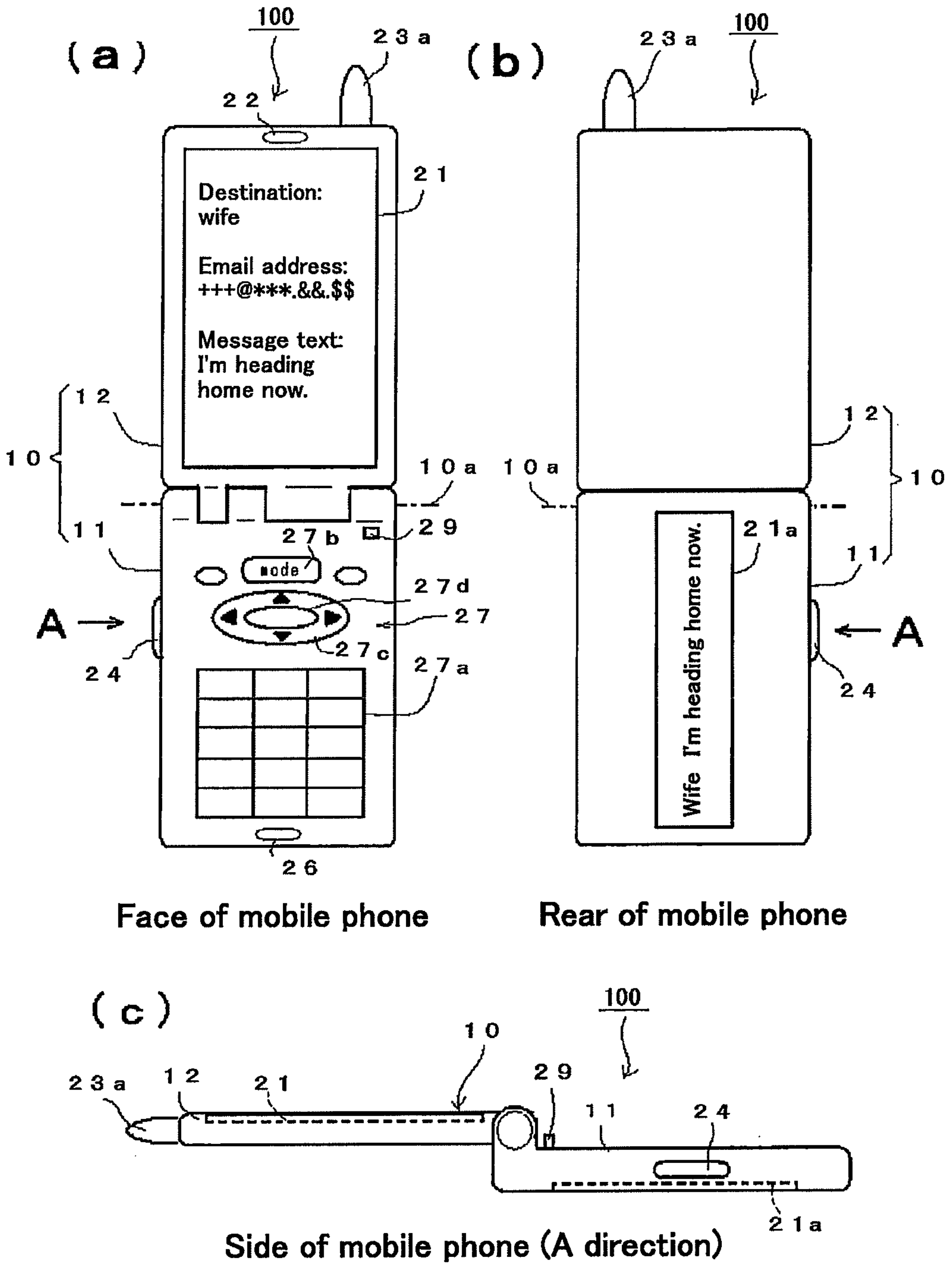
FIG. 2 is a drawing showing the external appearance of the mobile phone according to the preferred embodiment in use, with FIG. 2A being a frontal view showing the face of the mobile phone, FIG. 2B being a rear view showing the rear surface of the mobile phone, and FIG. 2C being a side view of the mobile phone as viewed from the A direction in FIGS. 2A and 2B.

As shown in FIGS. 2A to 2C, the mobile phone according to this preferred embodiment is foldable, and the body 10 thereof has a first unit 11 and a second unit 12 the relative orientation of which is changeable through rotation.

As shown in FIG. 3A, the body 10 can achieve a storage state (folded state) by the second unit 12 being caused to rotate with respect to the first unit 11 about a rotation shaft 10*a*. In addition, as shown in FIG. 3B, the body 10 can achieve a usage state (open state) by the second unit 12 being caused to rotate with respect to the first unit 11 about the rotation shaft 10*a*.

As shown in FIG. 2A, the operation unit 27 and, the state detection unit 29 are arranged on the face of the first unit 11, and the face display 21 is arranged on the face of the second unit 12.

The operation unit 27 is composed of a ten keypad 27*a* for inputting text, numbers and/or the like; a mode selection screen button 27*b* for cause a mode selection screen to be displayed on the face display 21; a scroll key 27*c* for scrolling a cursor reverse-displayed on the face display 21; and a determination key 27*d* for causing determination (selection) of content selected by the cursor or various types of input information.

This state detection unit 29 turns on when pressed by the surface of the second unit 12 when the body 10 is placed in the storage state, as shown in FIG. 3A. In addition, the state detection unit 29 turns off when the state of being pressed by the surface of the second unit 12 is released upon the body 10 being placed in the usage state, as shown in FIG. 3B.

The mobile phone 100 is such that the faces of both the first unit 11 and the second unit 12 are exposed by the storage state of the body 10 being released and the body achieving the usage state. Furthermore, in this usage state email addresses and message text and/or the like can be input through operation of the operation unit 27 while confirming the email input screen displayed on the face display 21.

As shown in FIG. 2B, the rear display 21*a* is arranged on the rear surface of the first unit 11. The rear display 21*a* is such that the display contents thereof can be confirmed whether the body 10 is in the storage state or the usage state. In other words, the rear display 21*a* is arranged on the rear surface of the first unit in a position that can be constantly viewed in the body 10.

As shown in FIG. 2C, the side key 24 is positioned on the side surface of the first unit 11. The side key 24 is such that the pressing operation thereof is possible whether the body 10 is in the storage state or the usage state. In other words, the side key 24 is in a state in which the pressing operation is constantly possible.

In this preferred embodiment, the microphone 26 is positioned in the first unit 11 as shown in FIG. 2A, as are the control unit 20, the vibration unit 25 and the memory unit 28 (see FIG. 1). In addition, the antenna 23*a* and the speaker 22 are positioned in the second unit 12 along with the wireless communication unit 23 (see FIG. 1), as shown in FIGS. 2A to 2C.

The mobile phone 100 according to this preferred embodiment can be set in multiple operating modes in order to make operation thereof easy. Among these, in a "one-push email input mode," the "email input screen" is displayed and a state is achieved in which the email address and message text to be transmitted by manual operation of the operation unit 27 can be input. In addition, in a "one-push transmission mode," the email information displayed on the face display 21 and the rear display 21*a* can be transmitted by just the operation of pushing the side key 24.

<Mode Selection Process>

The process of setting various operating modes for the mobile phone 100 according to this preferred embodiment is described below with reference to the flowchart in FIG. 4 and to FIGS. 5 to 7.

Figure 4:
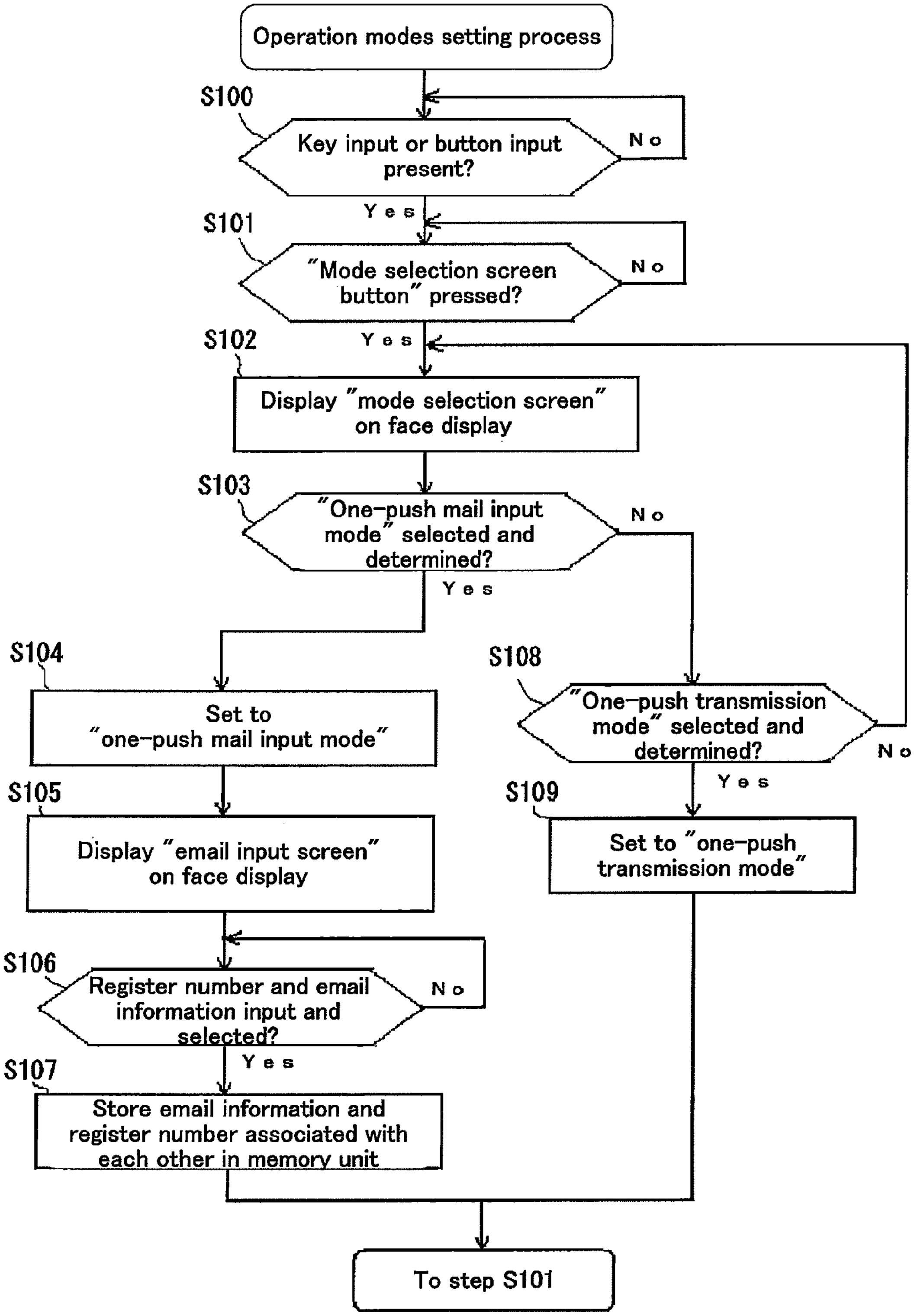
FIG. 4 is a flowchart showing the setting process for each operation mode in the mobile phone according to the preferred embodiment.
Figure 5:
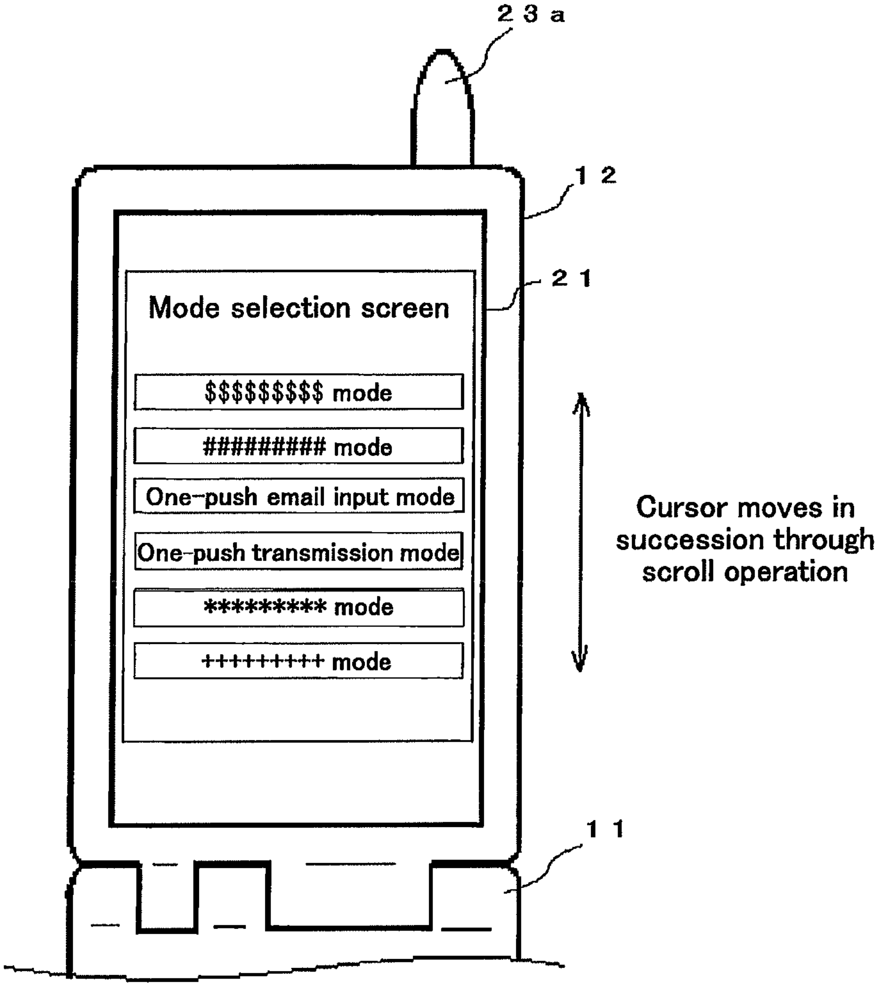
FIG. 5 is a drawing showing a state in which a mode selection screen is displayed on the display unit of the mobile phone according to the preferred embodiment.

As shown in FIG. 4, after the power source of the mobile phone 100 is turned on, the control unit 20 is in a standby state and determines whether or not there is an input operation from any of the keys or buttons (step S100). Furthermore, when it is determined that there is no input operation from any of the keys or buttons (step S100: No), the standby state continues in step S100. Furthermore, when it is determined that there has been an input operation from any of the keys or buttons (step S100: Yes), the control unit 20 determines the absence or presence of a pressing operation of the mode selection screen button 27*b* of the operation unit 27 (step S101).

Furthermore, when the control unit 20 determines that there has been a pressing operation of the mode selection screen button 27*b* (step S101: Yes), the control unit 20 displays the "mode selection screen" on the face display 21 (step S102), as shown in FIG. 5.

On the other hand, when the control unit determines that there has been no pressing operation of the mode selection screen button 27*b* of the operation unit 27 (step S101: No), the standby state continues (step S101).

Furthermore, when the control unit 20 determines that the "one-push email input mode" has been selected by the cursor displayed on the face display 21 being scrolled up and/or down using the scroll key 27*c* along with a push operation of the determination key 27*d* (step S103: Yes), the mobile phone 100 is set to "one-push email input mode" (step S104).

Figure 6:
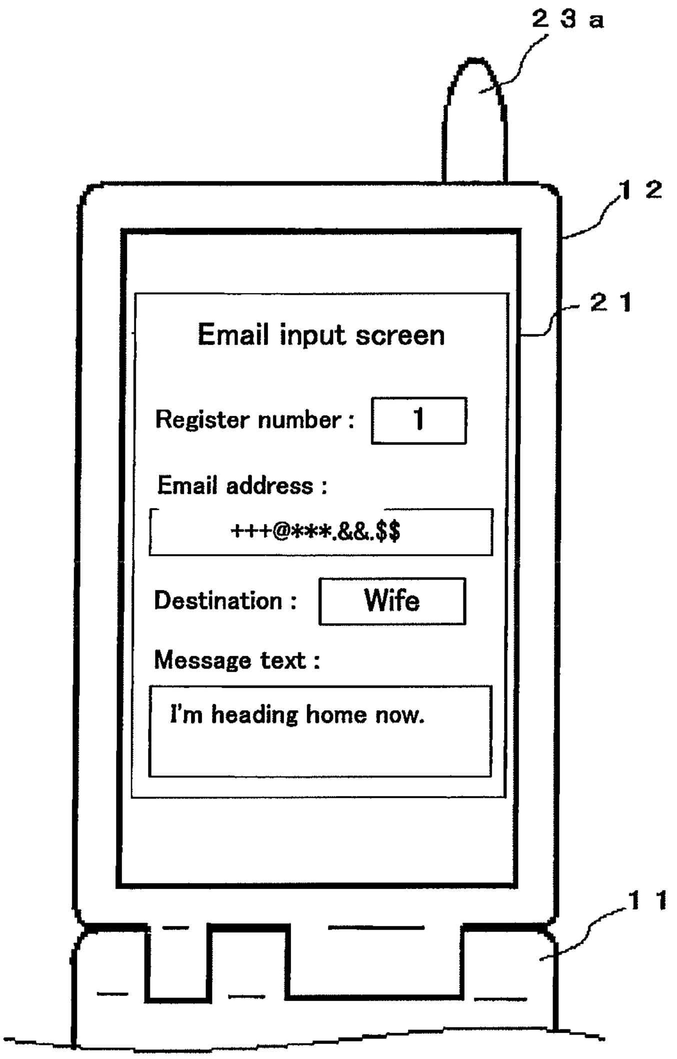
FIG. 6 is a drawing showing a state in which an email input screen is displayed on the display unit of the mobile phone according to the preferred embodiment.

In this "one-push email input mode," the face display 21 is controlled by the control unit 20 so that the "email input screen" is displayed on the face display 21 (step S105), as shown in FIG. 6. With this "email input screen," the device is in a state such that email addresses and message text to be transmitted by manual operation of the operation unit can be input.

With this "email input screen," a register number that is any of "1" to "4", along with an email address, a recipient indicated by the email address and message text as email information corresponding to that register number are input using the ten keypad 27*a*. After this input, when the determination key 27*d* is pressed (step S106), the control unit 20 causes email information (email address and message text) to be stored in the memory unit 28 in a state corresponding to the register number, in the data format shown in FIG. 7 (step S107).

For example, suppose the user inputs, in order, the register number "1", the email address "+++@*.&&.$$" of the spouse (wife), the destination "wife" indicating the email address and the message text "I'm heading home now" and presses the determination key 27***d*. In response to this, the control unit 20 stores the email address "+++@*.&&.$$", the destination "wife" indicating the email address and the message text "I'm heading home now" in a memory region of the memory unit 28** corresponding to the register number "1".

In addition, the user then inputs, in order, the register numbers "2" to "4", the email addresses of the user's wife, a work supervisor and a friend, destinations indicating each email address, and prescribed message text for each of these destinations and presses the determination key 27*d*. In response to this, the control unit stores the email address of the user's wife, the work supervisor and the friend, the destinations "wife", "work supervisor" and "friend" indicating the email addresses, and prescribed message text for each of these destinations in memory regions of the memory unit 28 corresponding to the register numbers "2" to "4".

On the other hand, when the control unit 20 determines that the "one-push email input mode" has not been selected (step S103: No), the process moves to step S108. Furthermore, in this step S108, when the control unit 20 determines that the "one-push transmission mode" has been selected by the cursor displayed on the face display 21 being scrolled up and/or down using the scroll key 27*c* and that there was a pressing operation by the determination key 27*d* (step S108), the mobile phone 100 is set to the "one-push transmission mode" (step S109). In this "one-push transmission mode," the email information displayed on the face display 21 and the rear display 21*a* is transmitted as an email by just a pressing operation of (pushing) the side key 24.

<Email Transmission Process>

Next, the process of transmitting email using the mobile phone 100 according to this preferred embodiment will be described with reference to the flowchart in FIG. 8 and FIG. 9.

Figure 8:
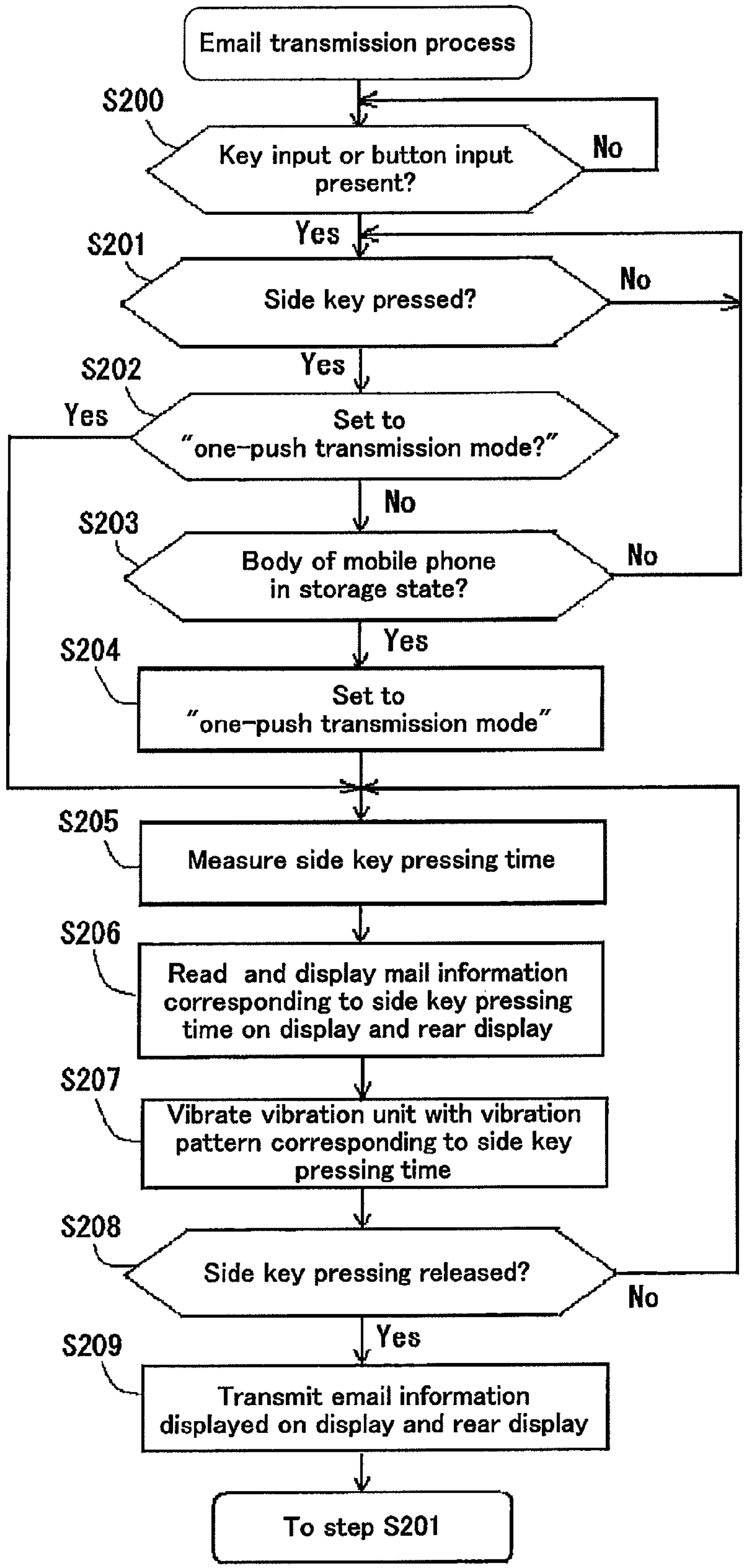
FIG. 8 is a flowchart showing the email transmission process using a mobile phone according to the preferred embodiment.

As shown in FIG. 8, after the power source of the mobile phone 100 is turned on, the control unit 20 determines the absence or presence of an input operation of any key or button, in a standby state (step S200). Furthermore, when there is no key or button input operation (step S200: No), the standby state in step S200 continues.

Furthermore, when the control unit 20 has determined that there has been an input operation from one of the keys or buttons (step S200: Yes), the control unit determines the absence or presence of a pressing operation by the side key 24 (step S201).

Furthermore, when the control unit 20 determines that there has been a pressing operation by the side key 24 (step S201: Yes), a determination is made as to whether or not the mobile phone 100 has been set in the "one-push transmission mode" (step S202).

On the other hand, when the control unit 20 determines that there is no pressing operation by the side key 24 (step S201: No), the standby state continues (step S201).

Furthermore, when the control unit 20 determines that the mobile phone 100 is not set in the "one-push transmission mode" (step S202: No), a determination is made as to whether or not the body 10 of the mobile phone 100 is in a storage state (step S203).

On the other hand, when the control unit 20 determines that the mobile phone 100 is in the "one-push transmission mode" (step S202: Yes), measurement of the pressing time of the side key 24 begins (step S205).

In step S202, when the control unit 20 determines that the body 10 of the mobile phone 100 is in the storage state (step S203: Yes), the mobile phone 100 is set to the "one-push transmission mode" (step S204).

On the other hand, when the control unit 20 determines that the body 10 of the mobile phone 100 is not in the storage state but is in the usage state (step S203: No), the standby state continues until the side key 24 is again pressed (step S201).

The control unit 20 measures the pressing time ts (in seconds) of the side key 24 in step S205 (step S205). The pressing time ts of the side key 24 is measured from when the pressing operation of the side key 24 began in step S201 until the pressing operation of the side key 24 is released in step S208.

Next, the control unit 20 reads different email information from the memory unit 28 in accordance with the pressing time ts of the side key 24, and displays such on the face display 21 and the rear display 21*a*, as shown in FIG. 9 (step S206).

However, when the pressing time ts of the side key 24 is less than 1 second ($0<ts<1$), the control unit 20 reads the email information of register number 1 (the email address "+++@*.&&.$$" of the spouse (wife), the destination "wife" corresponding to the email address and the message text "I'm heading home now") stored in the memory unit 28 in the data format shown in FIG. 7, and also displays this email information on the face display 21 and the rear display 21***a*.

In addition, when the pressing time ts of the side key 24 is at least one second but less than two seconds ($1 \leq ts \leq 2$), when the pressing time ts is at least two seconds but less than three seconds ($2 \leq ts \leq 3$) and when the pressing time ts is at least three seconds ($3 \leq ts$), in each case the control unit 20 reads email information for the register numbers 2, 3 or 4, respectively, (email address, destination corresponding to the email address and message text corresponding to these destinations) stored in the memory unit 28 in the data format shown in FIG. 7 and also displays this email information on the face display 21 and the rear display 21*a*.

Next, the control unit 20 causes the vibration unit 25 to vibrate in respectively differing vibration patterns in accordance with the pressing time ts of the side key 24, as shown in FIG. 10, by outputting an electrical signal composed of various signal patterns to the motor of the vibration unit 25 (step S207).

However, when the pressing time ts of the side key 24 is less than one second ($0<ts \leq 1$), the control unit 20 causes the vibration unit 25 to vibrate in a vibration pattern in which a vibration and a stopping of the vibration, each 0.1 second long, alternate with a period of 0.2 seconds. In addition, when the pressing time ts of the side key 24 is at least one second but less than two seconds ($1 \leq ts \leq 2$), the control unit 20 causes the vibration unit 25 to vibrate in a vibration pattern in which a vibration and a stopping of the vibration, each 0.2 second long, alternate with a period of 0.4 second. In addition, when the pressing time ts of the side key 24 is at least two seconds but less than three seconds ($2 \leq ts \leq 3$), the control unit 20 causes the vibration unit 25 to vibrate in a vibration pattern in which a vibration 0.3 second long alternates with a stopping of the vibration for 0.1 second, with a period of 0.4 second. In addition, when the pressing time ts of the side key 24 is at least three seconds ($3<ts$), the control unit 20 causes the vibration unit 25 to vibrate in a vibration pattern in which a vibration and a stopping of the vibration, each 0.15 second long, alternate with a period of 0.3 second.

Next, the control unit 20 determines whether or not the pressing operation of the side key 24 has been released (step S208). When it is determined that the pressing operation of the side key 24 has been released (step S208: Yes), the email information displayed on the face display 21 and the rear display 21*a* in step S206 is transmitted to a wireless base station using the wireless communication unit 23 (step S209). Through this, message text corresponding to an email address (destination) included in the email information is transmitted to that email address.

On the other hand, when the control unit 20 determines that the pressing operation of the side key 24 has not been released (step S208: No), measurement of the pressing time of the side key 24 continues.

Following this, the control unit 20 continues the standby state of determining the absence or presence of a pressing operation by the side key 24 (step S201).

With the mobile phone 100 according to this preferred embodiment, different email information including email address (destination) and message text is transmitted as email in accordance with the pressing time of the side key 24, and consequently it is possible to transmit predetermined message text to specific recipients using a simple method.

In addition, with the mobile phone 100 according to this preferred embodiment, the email address (destination) and message text are successively displayed as email information on the face display 21 and the rear display 21*a* in accordance with the pressing time of the side key 24. Furthermore, because it is possible to transmit the email information displayed at that point in time on the face display 21 and the rear display 21*a* as an email by simply releasing the pressing state of the side key 24, it is possible to transmit predetermined message text to specific recipients through a simple method while confirming the email address (destination) and message text to be transmitted.

In addition, with the mobile phone 100 according to this preferred embodiment, notification is made by vibration patterns differing in accordance with the pressing time of the side key 24 by the vibration unit 25, so for example it is possible to know of email information transmitted as email by that vibration pattern even when the mobile phone 100 is inside a pocket.

With this preferred embodiment, an example of the mobile phone 100 was described as a foldable device in which the storage state is set as the first unit 11 being folded over the second unit 12 and the usage state is set by opening these. However, this is intended to be illustrative and not limiting, for the mobile phone 100 may be a slide-type device in which the usage state and the storage state are set by the second unit 12 sliding relative to the first unit 11. Furthermore, the mobile phone 100 may be a rotatable type (with the axis of rotation of the second unit being set orthogonal to the operating surface of the first unit) in which the usage state and the storage state are set by the second unit 12 accomplishing a rotation movement relative to the first unit 11 without a folding action.

In addition, with this preferred embodiment, the state detection unit 29 positioned on the first unit 11 for detecting whether the body is in a storage state or a usage state was composed of a push button-type mechanical switch. However, this is intended to be illustrative and not limiting, for the state detection unit 29 may also be composed of a photosensitive sensor switch that detects blocking of light by the second unit 12, a magnetic detection sensor switch such as a hole element or an MRE element for detecting the strength and direction of a magnetic field from a magnet positioned in the second unit 12, and/or the like.

In addition, with this preferred embodiment, different email information is set as email in accordance with the pressing time of the side key 24. However, this is intended to be illustrative and not limiting, for it is also possible for email information to be allocated based on the operation volume of the side key 24, for example the pressing frequency of the side key 24, or in accordance with the pressing strength of the side key 24.

In addition, with this preferred embodiment, a push button-type mechanical switch was utilized in the side key 24 as the operation key. However, this is intended to be illustrative and not limiting, for it is also possible to compose such from sensor switches such as photosensitive, pressure-sensitive, electrical resistance detecting type, and/or the like.

In addition, the program for accomplishing the email transmission process according to this preferred embodiment may be recorded on a portable memory medium and/or the like. Such portable recording media include, for example, a CD-ROM (Compact Disc Read Only Memory) or a DVD-ROM (Digital Versatile Disk Read Only Memory) and/or the like. In addition, this program may be installed on the mobile phone 100 via various types of reading devices from the portable memory medium. Furthermore, this program may be downloaded and installed on the mobile phone 100 via an unrepresented communication unit from a network such as the Internet and/or the like. In addition, this program may be stored in a memory device such as a server and/or the like capable of communicating with the mobile phone 100, and may give instructions to the control unit 20. The readable memory medium on which this program is stored (for example, RAM, ROM (Read Only Memory), CD-R, DVD-R, hard disk or flash memory) is a computer-readable program product.

The present invention is not limited to the mobile phone described in the above preferred embodiment, and for example can be applied to a communication terminal such as a PC (Personal Computer) having a communication function, a PDA (Personal Digital Assistant) and/or the like. In other words, the embodiment described above is for explanatory purposes and does not limit the scope of the present invention. Accordingly, one skilled in the art could utilize the embodiment with the various elements or all elements substituted for elements equivalent thereto, but such embodiments are also included within the scope of the present invention.

The present application claims the benefit of Japanese Patent Application No. 2009-231423, submitted 5 Oct. 2009, the entire disclosure of which is incorporated by reference herein.

EXPLANATION OF SYMBOLS

10 body
11 first unit
12 second unit
20 control unit
21 face display
21*a* rear display
22 speaker
23 wireless communication unit
24 side key (operation key)
25 vibration unit
26 microphone
27 operation unit
28 memory unit
29 state detection unit
100 mobile phone.

The invention claimed is:

1. A communication terminal, comprising:
a communication unit for transmitting and receiving emails;
a side key operated by a user;
a memory unit for storing email information that includes: different registered numbers each representing a duration of pressing the side key; and email addresses and message text that are associated with the respective registered numbers;
a control unit for measuring the duration of pressing the side key, and transmitting message text associated with a registered number representing the measured duration as email using the communication unit to an email address associated with the registered number representing the measured duration;
a body that is settable in a folded state or an open state by turning a second unit relative to a first unit; and
a state detection unit for detecting whether or not this body is in the folded state,
wherein when the state detection unit detects that the body is in the folded state, the control unit transmits, in accordance with the measured duration of pressing the side key, the message text associated with the registered number representing the measured duration as email using the communication unit, to the email address associated with the registered number.

2. The communication terminal of claim 1, wherein the side key is positioned at a position on the body so as to be operable at least in the folded state.

3. The communication terminal of claim 1, further comprising a display unit positioned at a position on the body so as to be viewable at least when the body is in a the folded state;
wherein the control unit displays, in accordance with the measured duration of pressing the side key, information that indicates the message text and the email address associated with the registered number representing the measured duration on the display unit and also transmits such as email using the communication unit.

4. The communication terminal of claim 1, further comprising a vibration unit that vibrates in a prescribed vibration pattern;

wherein the control unit causes the vibration unit to vibrate with different vibration patterns in accordance with the measured duration of pressing the side key, and also transmits the message text associated with the registered number representing the measured during as email using the communication unit, to the email address associated with the registered number representing the measured duration.

5. An email transmission method executed in a communication terminal comprising:

a body settable in a folded state and an open state by turning a second unit relative to a first unit; and a memory for storing email information that includes: different registered number each representing a duration of pressing the side key; and email addresses and message text that are associated with the respective registered numbers, the method comprising:

detecting whether or not the body is in the folded state;

measuring a duration of pressing a side key operated by a user; and transmitting, when it is detected that the body is in the folded state, message text associated with a registered number representing the measured duration as email to an email address associated with the registered number representing the measured duration.

6. A non-transitory computer-readable recording medium for storing a program that causes a computer built into a communication terminal comprising:

a body settable in a folded state and an open state by turning a second unit relative to a first unit;

a communication unit for transmitting and receiving email;

a state detection unit for detecting whether or not the body is in the folded state; and an side key operated by a user, to function as:

a memory for storing email information that includes: different registered numbers each representing a duration of pressing the side key; and email addresses and message text that are associated with the respective registered numbers; and a controller for measuring the duration of pressing the side key, and transmitting message text associated with a registered number representing the measured duration as email using the communication unit, to an email address associated with the registered number representing the measured duration, when the state detection unit detects that the body is in the folded state.

* * * * *